June 23, 1970 V. H. MUTTART 3,516,302
EJECTOR PIN RETRACTION MECHANISM FOR MOLDING OPERATION
Filed July 15, 1968 3 Sheets-Sheet 1

INVENTOR.
VINCENT H. MUTTART
BY
ATTYS.

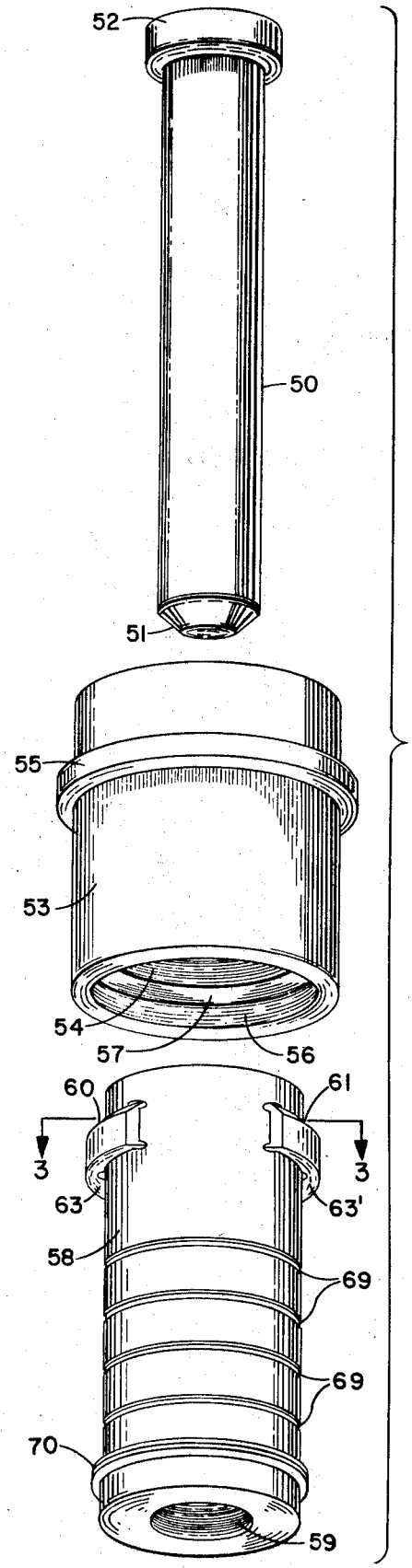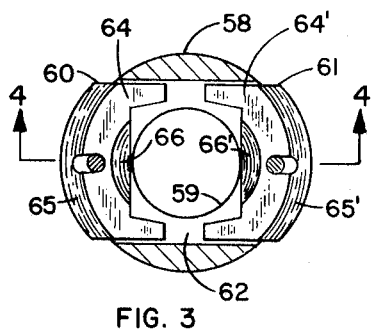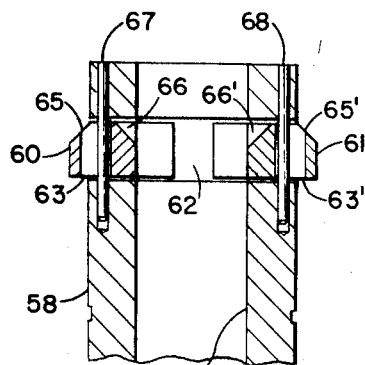

June 23, 1970 V. H. MUTTART 3,516,302
EJECTOR PIN RETRACTION MECHANISM FOR MOLDING OPERATION
Filed July 15, 1968 3 Sheets-Sheet 3

INVENTOR.
VINCENT H. MUTTART
BY
Hinderstein & Silber
ATTYS

United States Patent Office 3,516,302
Patented June 23, 1970

3,516,302
EJECTOR PIN RETRACTION MECHANISM FOR MOLDING OPERATION
Vincent H. Muttart, 902 Rockaway Drive, Placentia, Calif. 92670
Filed July 15, 1968, Ser. No. 747,772
Int. Cl. G05g 5/08
U.S. Cl. 74—527                                    9 Claims

ABSTRACT OF THE DISCLOSURE

In a mechanism comprising first, second and third elongated, substantially cylindrical members, the first member being adapted to reciprocate within a bore in the second member and the second member being adapted to reciprocate within a bore in the third member and a pair of cam members, which are laterally, slideably mounted in the second member intermediate the ends thereof and which are operative to reciprocate between a first position extending internally of the bore in the second member to prevent movement of the first member therethrough and a second position extending externally of the second member to prevent movement of the second member through the bore in the third member the improvement wherein the third member has a second, larger bore therein, the first mentioned bore and the second bore being connected by a tapered surface, wherein one end of the first member has a tapered surface, and wherein each of the cam members has tapered surfaces on the innermost and outermost portions of one side thereof, the tapered surfaces on the cam members having the same shape and the same angular orientation as the tapered surfaces on the first member and on the third member to permit high impact strength and high accuracy.

BACKGROUND OF THE INVENTION

Field of the Invention

The present invention relates to an ejector pin retraction mechanism for use in a molding operation and, more particularly, to a simple and foolproof mechanism for effecting early ejector pin return in an injection or transfer molding operation or in the die casting of metals.

Description of the prior art

In the manufacture of molded parts, sophisticated machinery has been developed to perform the several operations required. A typical operation sequence is as follows. Starting from the point where the mold cavity is fully closed, a plastic or other flowable material is injected into the mold cavity where it is solidified to form the finished product. Immediately thereafter, the cavity plates begin to open, parting at the center line of the mold cavity. At this time, the finished product is located in one of the cavity plates. As this plate continues to move away from the other plate, it comes in contact with a plurality of knock out rods which operate to hold stationary an ejector plate as the one cavity plate continues to move. The ejector plate supports at least one ejector pin which is located in a hole beneath the mold cavity and is in contact with the finished product. Since the ejector pin is stationary, as the one cavity plate continues to move, the ejector pin, being in contact with the work piece, pushes it out of the mold. The mold cavity is now free and ready to form another product. The one cavity plate now reverses direction tending to close the mold. However, at this time, the ejector pin or pins are still extending into the mold cavity and a mechanism must be provided to retract them before the cavity plates come together. When the cavity plates do come together, the procedure repeats.

In the simplest case, the mechanism for retracting the ejector pins from the mold cavity may take the form of a simple rod attached to the ejector plate and positioned so that as the cavity plates come together, the rod pushes the ejector plate away from the cavity thereby retracting the ejector pins. However, the difficulty with this mechanism is that the ejector pins are not fully retracted from the mold cavity until the cavity is fully closed and, under some circumstances, this is unacceptable. More specifically, it is very often the case that as the mold cavity closes, various types and shapes of cores are caused to move into the mold cavity from the sides thereof, such as required when molding complicated shapes. In a typical case, these side cores begin moving into the mold cavity well before the cavity is fully closed. However, it can readily be appreciated that if the ejector pins are not retracted from the cavity before it is fully closed, and if these ejector pins are located in the path of the moving side cores, the side cores may engage the ejector pins resulting in damage or breaking of one or both parts.

Because of this problem, it has become necessary to provide a mechanism for fully retracting the ejector pins from the mold cavity before the cavity is fully closed and before the side cores begin their entrance into the cavity. For this purpose, several different types of mechanisms have been proposed. However, all of these prior art mechanisms have the common disadvantage that they must be attached to the side of the molding equipment. As a result, because the molding equipment is heavy and cumbersome, this has proven to be a difficult, time-consuming and costly task.

SUMMARY OF THE INVENTION

According to the present invention, there is provided a simple and foolproof mechanism for controlling the retraction of the ejector pins in a molding operation. The present mechanism may be readily installed into existing molding equipment by merely drilling a hole or holes through the existing machinery from the top or bottom thereof, thereby eliminating the problem of attachment from the side.

The present invention consists of an actuator pin connected to one of the cavity plates and positioned to face and cooperate with the other cavity plate. A bushing is positioned in the other cavity plate in such a manner that the actuator pin passes through the center thereof. A movable post having an outside diameter equal to the inside diameter of the bushing and an inside diameter equal to the diameter of the actuator pin is attached to the ejector plate which supports the ejector pins. A pair of cam members are slideably mounted in the movable post. The shape of the cam members is such that when they are in their inner-most position, the movable post is free to reciprocate within the bushing but the actuator pin is not free to reciprocate within the movable post. When the cam members are in their outer-most position, the movable post is not free to reciprocate within the bushing but the actuator pin is free to reciprocate within the movable post.

With the ejector pins fully extended into the mold cavity, the movable post is positioned within the bushing and the actuator pin is neither in contact with the post or the bushing. As the cavity plates begin to close, the actuator pin first contacts the cam members. As the cavity plates continue closing, the actuator pin pushes on the cam members which are in their innermost position. The cam members cannot back up to let the actuator pin pass through the post because they are contained inside the bushing. As a result, the movable post is pushed away from the cavity plate by the actuator pin forcing the ejector plate back and retracting the ejector pins from the mold cavity. The cavity plates continue closing until the ejector pins are fully retracted. This event is chosen to coincide with the time when the cam members reach the end of the bushing. At this time, the cam members slip outwardly allowing the actuator pin to slip into the movable post, so that the post may now move with the bushing for the closing of the mold cavity. The cavity plates then continue their movement until the cavity is completely closed.

It is, therefore, an object of the present invention to provide a novel ejector pin retraction mechanism.

It is a further object of the present invention to provide apparatus for controlling the retraction of one or more ejector pins from a mold cavity.

It is a still further object of the present invention to provide an ejector pin retraction mechanism which may be readily fitted into existing molding equipment.

It is another object of the present invention to provide an ejector pin retraction mechanism which may be readily adjusted for different sizes of molding equipment.

Still other objects, features and attendant advantages of the present invention will become apparent to those skilled in the art from a reading of the following detailed description of a preferred physical embodiment constructed in accordance therewith, taken in conjunction with the accompanying drawings wherein like numerals designate like parts in the several figures and wherein:

BRIEF DESCRIPTION OF THE DRAWINGS

FIG. 2 is a perspective view of a mechanism constructed in accordance with the teachings of the present invention;

FIG. 3 is a view taken along lines 3—3 of FIG. 2;

FIG. 4 is a view taken along lines 4—4 of FIG. 3; and

DESCRIPTION OF THE PREFERRED EMBODIMENT

Figure 1:
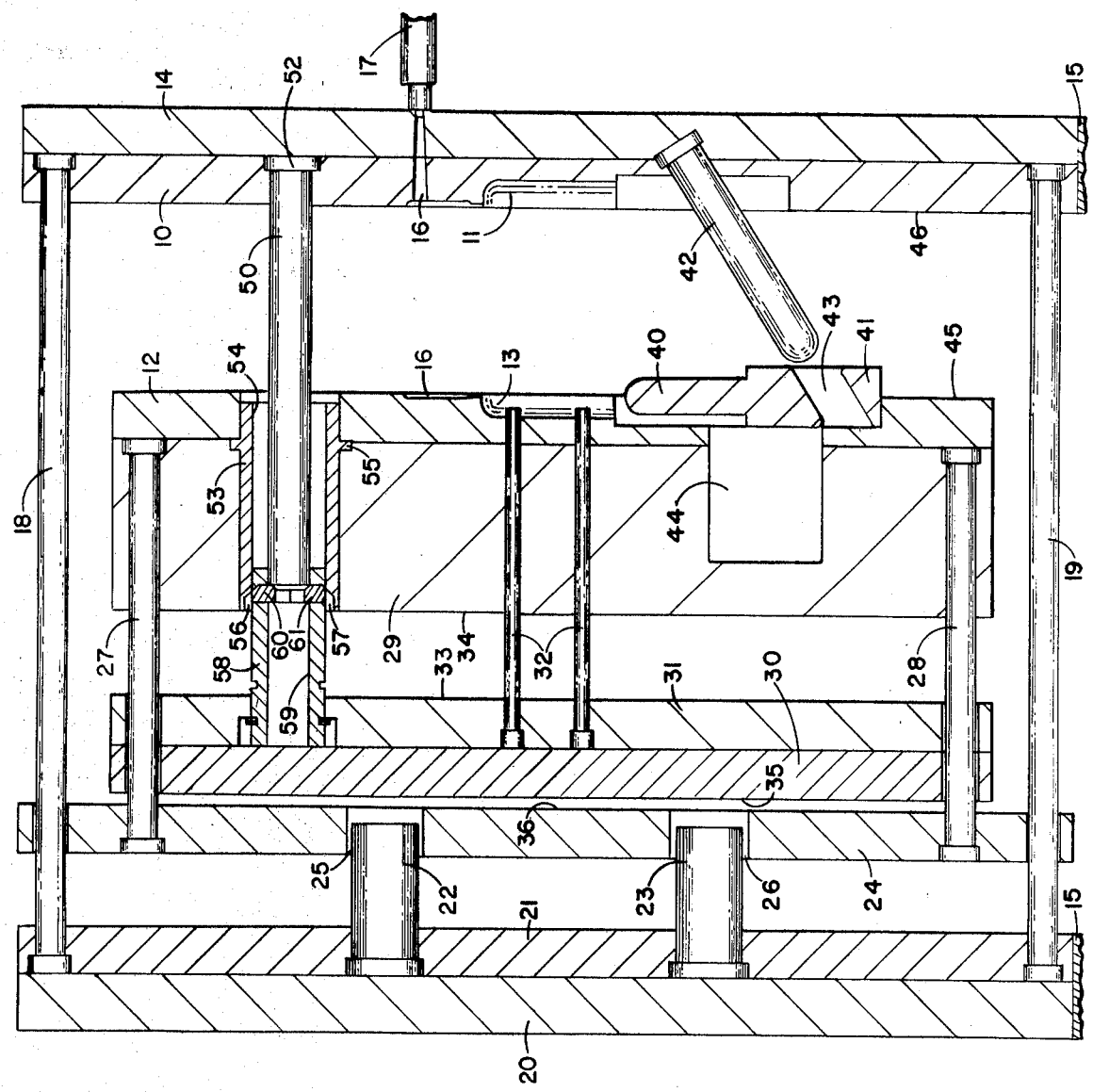
FIG. 1 is a cross-sectional, elevation view of typical molding apparatus showing the relationship of the parts and the operation thereof.

Referring now to the drawings and, more particularly, to FIG. 1 thereof, typical apparatus for the manufacture of molded parts consists of a first cavity plate 10 having a cavity 11 therein and a second cavity plate 12 having a cavity 13 therein. When cavity plates 10 and 12 are in contact, cavities 11 and 13 form the mold cavity. Cavity plate 10 is in contact with a clamp plate 14 which backs up and supports cavity plate 10. Typically, cavity plate 10 and clamp plate 14 are held stationary on a fixed base 15. A passageway 16 is generally provided in plates 10, 12 and 14 to permit fluid cooperation between cavity 11 and a nozzle 17. Passageway 16 conducts the plastic or other flowable material from nozzle 17 to the mold cavity.

Plates 10 and 14 support one end of a pair of elongated, rod-like members 18 and 19 which are connected, at their opposite ends, to a knock-out rod support plate 20 and a retainer plate 21. Plates 20 and 21 are also held stationary on fixed base 15. Plates 20 and 21 support a pair of knock-out rods 22 and 23 whose purpose will be explained more fully hereinafter.

Members 18 and 19 support the opposite ends of a movable back-up plate 24. Back-up plate 24 has a pair of bores 25 and 26 wherein whose diameters are greater than the diameters of knock-out rods 22 and 23 so that knock-out rods 22 and 23 may pass freely therethrough, as shown. Back-up plate 24 further supports one end of a pair of elongated, rod-like members 27 and 28 which are connected, at their opposite ends, to cavity plate 12 and a cavity back-up plate 29. Members 27 and 28 hold plates 24, 12 and 29 in fixed relation.

Also supported by members 27 and 28 is an ejector pin support plate 30 and an ejector pin retainer plate 31. Plates 30 and 31 support a plurality of ejector pins 32. Plates 30 and 31 are freely movable with respect to rods 27 and 28 from a position wherein surface 33 of plate 31 is in contact with surface 34 of plate 29 to a position where surface 35 of plate 30 is in contact with surface 36 of plate 24. As plates 30 and 31 move relative to plates 12 and 29, ejector pins 32 are extended into or retracted from cavity 13, as will be explained more fully hereinafter.

Cavity plates 10 and 12 and cavities 11 and 13 have been shown for the case where it is desired to mold a product having the shape of a cigarette box, a five-sided, substantially U-shaped member. Accordingly, cavity 11 forms one-half of the mold and cavity 13 forms the other half. However, it is necessary that the finished product be hollow. For this purpose, a side core 40, which is mounted on a slideable support member 41, is provided. As cavity plates 10 and 12 come together, slide member 41 is adapted to move to extend core 40 into the mold formed by cavities 11 and 13. This operation is achieved under the control of a slant pin 42 which is fixedly attached at one end thereof to plates 10 and 14. Slant pin 42 is positioned at a predetermined angle, as will appear more fully hereinafter. Slide 41 has a bore 43 therein positioned at an angle equal to the angle of slant pin 42. Plates 12 and 29 have a bore 44 therein to receive slant pin 42 as these plates move toward plate 10.

From FIG. 1 it can be seen that as plate 12 moves toward plate 10 to close cavity halves 11 and 13, slant pin 42 extends into bore 43 in slide 41. As plate 12 continues to move, slide 41 is forced upwardly due to the angular position of pin 42 so that when surface 45 of cavity plate 12 comes into contact with surface 46 of cavity plate 10, core 40 is fully extended into cavities 11 and 13 to form the proper orifice for molding a cigarette box shape.

A typical operation sequence is as follows. Starting from the time when the mold is fully closed and surface 45 is in contact with surface 46, surfaces 35 and 36 will be in contact and ejector pins 32 will be fully retracted from cavities 11 and 13. At this time, the plastic or other flowable material is injected from nozzle 17 via passageway 16 into the mold cavity where it is solidified to form the finished product. Immediately thereafter, back-up plate 24 begins to move on members 18 and 19 to separate surfaces 45 and 46. At this time, the finished product is located in cavity 13. As plate 24 continues to move away from plate 10, member 41 starts to retract core 40 from the mold cavity under the control of pin 42. When plate 24 is in the position shown in FIG. 1, core 40 has been fully withdrawn and the product is in position to be ejected from cavity 13. Therefore, as plate 24 continues to move away from plate 10, a point is reached where knock-out rods 22 and 23 contact surface 35 of plate 30. Thereafter, as plate 24 continues to move, plates 30 and 31 and ejector pins 32 are held stationary so that ejector pins 32 are extended into cavity 13 thereby ejecting the part.

The mold is now ready to be reclosed to repeat the operation. Surface 33 of plate 31 is now in contact with surface 34 of plate 29 and ejector pins 32 are fully extended into cavity 13. Plate 24 now begins to move toward plate 10. When plate 24 reaches the position shown in FIG. 1, core 40 will begin its movement into cavity 13. However, since the paths of core 40 and ejector pins 32 cross, some mechanism must be provided to retract ejector pins 32 from core 30 before the motion of core 40 begins. This is the function performed by the present invention.

Referring now to FIGS. 1 through 4, the present mechanism comprises an actuator pin 50 which is an elongated, substantially cylindrical member, one end of which has a taper 51 and the other end 52 of which is supported by plates 10 and 14 so that pin 50 is positioned perpendicular to plates 12 and 29. The present mechanism further comprises a bushing 53, which is an elongated, substantially cylindrical member having a bore 54 therein throughout substantially the entire length thereof and an annular band 55 surrounding the outside thereof at a point intermediate its opposite ends. At one end thereof bushing 53 contains a counter bore 56 having a diameter greater than bore 54. Bores 54 and 56 are connected by a tapered section 57. As shown in FIG. 1, the length of bushing 53 is substantially the same as the combined length of plates 12 and 19, and bushing 53 is fixedly positioned within a bore in plates 12 and 29, band 55 preventing axial motion thereof. Bushing 53 is positioned with respect to plates 12 and 29 in such a manner that actuator pin 50 passes through the center of bore 54 as plates 12 and 29 move with plate 24.

The present mechanism further includes a movable post 58 which is an elongated, substantially cylindrical member having an outside diameter which is equal to or slightly less than the diameter of bore 54 so that post 58 may freely reciprocate within bore 54. Post 58 has a bore 59 therein throughout the entire length thereof. The diameter of bore 59 is equal to or slightly greater than the diameter of actuator pin 50 so that actuator pin 50 may freely reciprocate within bore 59. Positioned at the upper end, as seen in FIG. 2, of post 58 is a pair of cam members 60 and 61 which are slideably positioned in a substantially rectangular opening 62 in post 58. As shown most clearly in FIGS. 3 and 4, cam members 60 and 61 have substantially flat bottom surfaces 63 and 63', respectively, which are freely slideable on the bottom of rectangular opening 62. Centrally located on the top of cam members 60 and 61 are substantially flat surfaces 64 and 64', respectively, which are slideable along the top surface of opening 62. The outer ends of the top surfaces of cam members 60 and 61 are tapered at 65 and 65', respectively, tapers 65 and 65' being positioned at substantially the same angle as taper 57 in bushing 53, so that as post 58 moves into bushing 53, taper 57 readily urges members 60 and 61 inwardly. The inner ends of the top surfaces of cam members 60 and 61 are tapered at 66 and 66', respectively, tapers 66 and 66' being inclined at the same angle as taper 51 of actuator pin 50 so that as pin 50 moves into post 58, taper 51 readily urges members 60 and 61 outwardly. A pair of pins 67 and 68 are fixedly connected to post 58 and extend through cam members 60 and 61 to limit the motion thereof between a first position shown in FIGS. 2–4 where the inner-most surfaces of members 60 and 61 are aligned with bore 59 of post 58 and a second position wherein the outer-most surfaces of members 60 and 61 are aligned with the outside surface of post 58.

As shown in FIG. 1, post 58 is adapted to be fixedly connected to plates 30 and 31 to move therewith. To accommodate varying sizes of plates 30 and 31 and varying extents of movement thereof, post 58 has cut therein a plurality of annular grooves 69. A removable lock ring 70 is adapted to be fitted into any one of annular grooves 69 depending upon the size of the molding apparatus. Thereafter, the remainder of post 58 is adapted to be cut off. For example, as shown in FIG. 1, ring 70 is positioned in the second annular groove and the remainder of post 58 has been eliminated.

Figure 5:
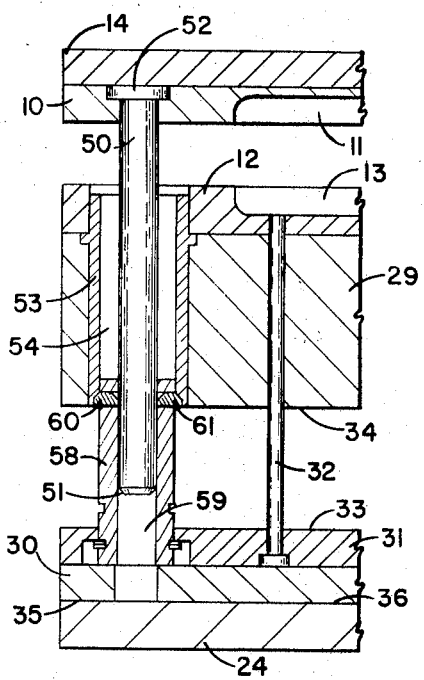
FIGS. 5–8 are a series of views of a portion of the apparatus of FIG. 1 showing the operation of the present mechanism.
Figure 6:
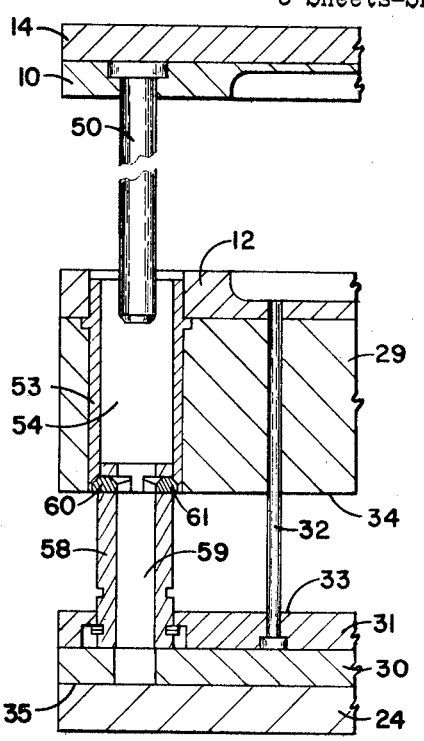
Figure 7:
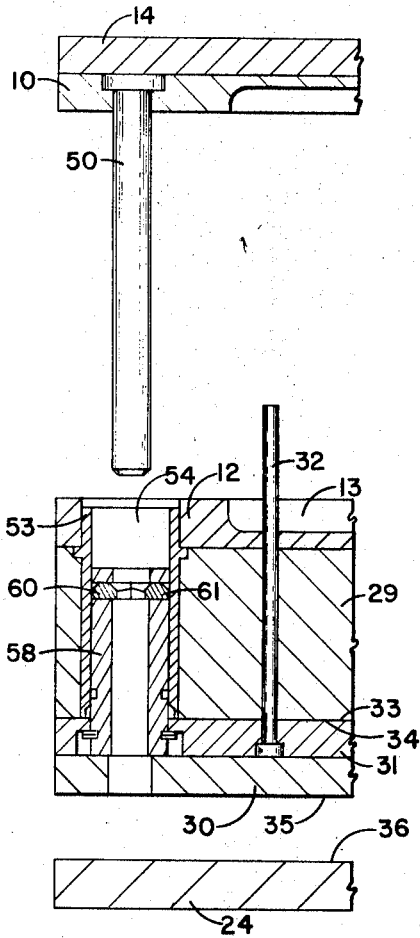

Referring now to FIGS. 5–8, the operation of the present invention may best be understood. In FIG. 5, the mold has been completed and cavity plates 10 and 12 have just begun to separate. At this time, actuator pin 50 is extending into bore 59 in post 58 and cam members 60 and 61 are in their outermost position. In this position, surfaces 65 and 65' of cam members 60 and 61 are in contact with taper 57 between bores 54 and 56 of bushing 53 and the outer surfaces of members 60 and 61 are in contact with bore 56. This is the position in which surface 35 of plate 30 is in contact with surface 36 of plate 24 and ejector pins 32 are fully retracted from cavity 13. As described previously with respect to FIG. 1, plate 24 continues to move back until the position shown in FIG. 6 is reached where actuator pin 50 is fully withdrawn from post 58. When plate 24 is in this position, knock-out rods 22 and 23 have just extended through bores 25 and 26 and are in contact with surface 35 of plate 30. Therefore, as plate 24 moves from the position shown in FIG. 6 to the position shown in FIG. 7, plates 30 and 31 are forced upwardly with respect to plates 12 and 29. At this time, since actuator pin 50 is fully retracted from post 58, cam members 60 and 61 are free to move to their inner-most position so that post 58 can freely move into bore 54 in bushing 53 until surface 33 of plate 31 contacts surface 34 of plate 29. In this position, and as shown in FIG. 7, ejector pins 32 are fully extended into cavity 13 and the finished product has been ejected.

Figure 8:
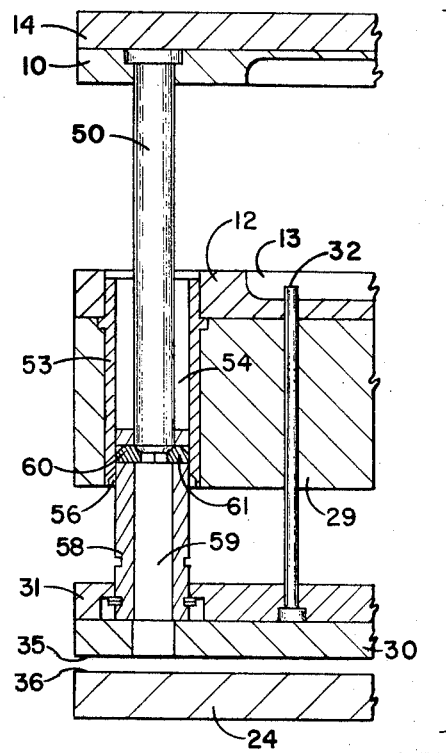

Plate 24 now begins to move toward plates 10 and 14. As plates 24, 30, 31, 29 and 12 move forward, a position is reached where actuator pin 50 enters post 58 and taper 51 of actuator pin 50 contacts surfaces 66 and 66' of cam members 60 and 61. However, as shown in FIGS. 7 and 8, at this time, since post 58 is within bushing 53, cam members 60 and 61 are not free to move outwardly. Accordingly, and as shown in FIG. 8, as plates 24, 29 and 12 continue to move toward plate 10, post 58 is held stationary by pin 50 thereby holding plates 30 and 31 stationary. Therefore, as plates 24, 29 and 12 continue to move forward, ejector pins 32 are automatically retracted from cavity 13. This procedure continues until post 58 is withdrawn sufficiently from bushing 53 to permit cam members 60 and 61 to be forced outwardly into counter bore 56. This event is chosen to coincide with the time when surface 35 of plate 30 contacts surface 36 of plate 24 and when ejector pins 32 are fully retracted from cavity 13. Thereafter, actuator pin 50 is free to move into bore 59 in post 58 and plates 30 and 31 start to move forward with plates 12, 29 and 14. Support plate 24 then continues to move until cavity plates 10 and 12 contact each other, whereupon the procedure repeats.

It can, therefore, be seen that in accordance with the present invention there is provided a simple and foolproof mechanism for controlling the retraction of the ejector pins in a molding operation. The present apparatus may be readily installed into existing molding equipment by simply drilling bores and counter-bores of appropriate sizes along one side of the molding equipment as shown in FIG. 1.

While the invention has been described with respect to a preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. In a mechanism comprising an elongated actuator pin; an elongated sleeve having a passageway therein, said actuator pin adapted to reciprocate within said passageway in said sleeve, one end of said pin adapted to enter one end of said sleeve; an elongated bushing having a passageway therein, said sleeve adapted to reciprocate within said passageway in said bushing; and first and second cam members laterally, slideably mounted in opposite sides of said sleeve for controlling the relative movement of said pin, said sleeve and said bushing, each of said cam members being operative to reciprocate between a first position wherein the inner surface thereof extends internally of said passageway in said sleeve to prevent movement of said pin therethrough and to permit movement of said sleeve through said bushing and a second position wherein the outer surface thereof extends externally of said sleeve to prevent movement of said sleeve through said passageway in said bushing and to permit movement of said pin through said sleeve, the improvement wherein:

said one end of said pin has a tapered surface and wherein each of said cam members comprises:

a tapered surface on the innermost portion of the side thereof adjacent said one end of said sleeve, the tapered surfaces on said cam members having the same shape and the same angular orientation as the tapered surface at said one end of said actuator pin so that said tapered surface of said pin contacts said tapered surfaces on said cam members to urge said cam members from said first position to said second position.

2. In a mechanism according to claim 1, the improvement wherein said elongated bushing has a second, larger passageway therein, said first mentioned passageway and said second passageway being connected by a tapered surface, and wherein each of said cam members comprises: a second tapered surface on the outermost portion of the side thereof closest said one end of said sleeve, the second tapered surfaces on said cam members having the same shape and the same angular orientation as the tapered surface in said bushing.

3. In mechanism according to claim 2, wherein said sleeve, said bushing and said passageway in said bushing are cylindrical, the improvement wherein said second tapered surfaces on said cam members are conical.

4. In a mechanism according to any one of claims 1, 2 and 3, wherein said actuator pin and said passageway in said sleeve are cylindrical, the improvement wherein said tapered surfaces on the innermost portions of said cam members are conical.

5. In a molding machine having first and second relatively moveable cavity plates and an ejector pin support plate, each of said cavity plates having a molding cavity therein, said ejector pin support plate supporting at least one ejector pin, said support plate being moveable relative to said second cavity plate to move said ejector pin into and out of said cavity in said second cavity plate, a mechanism for retracting said ejector pin from said cavity in said second cavity plate before the closing of said first and second cavity plates comprising:

an elongated actuator pin, one end of said pin being connected to said first cavity plate;

an elongated sleeve having a passageway therein, one end of said sleeve being connected to said ejector pin support plate, said actuator pin adapted to reciprocate within said passageway in said sleeve, the other end of said pin adapted to enter the other end of said sleeve;

an elongated bushing having a passageway therein, said bushing being connected to said second cavity plate, said sleeve adapted to reciprocate within said passageway in said bushing; and first and second cam members laterally, slidably mounted in opposite sides of said sleeve for controlling the relative movement of said pin, said sleeve and said bushing, each of said cam members being operative to reciprocate between a first position wherein the inner surface thereof extends internally of said passageway in said sleeve to prevent movement of said pin therethrough and to permit movement of said sleeve through said bushing, and a second position wherein the outer surface thereof extends externally of said sleeve to prevent movement of said sleeve through said passageway in said bushing and to permit movement of said pin through said sleeve, said other end of said pin contacting said cam members when said sleeve is positioned internally of said bushing thereby preventing movement of said sleeve and said ejector pin support plate as said second cavity plate moves towards said first cavity plate until said ejector pin is retracted from said cavity in said second cavity plate.

6. A mechanism according to claim 5 wherein:

said other end of said pin has a tapered surface and wherein each of said cam members comprises:

a tapered surface on the innermost portion of the side thereof adjacent said other end of said sleeve, the tapered surfaces on said cam members having the same shape and the same angular orientation as the tapered surface at said other end of said actuator pin so that said tapered surface of said pin contacts said tapered surfaces on said cam members.

7. A mechanism according to claim 6 wherein said elongated bushing has a second, larger passageway therein, said first mentioned passageway and said second passageway being connected by a tapered surface, and wherein each of said cam members comprises: a second tapered surface on the outermost portion of the side thereof closest said other end of said sleeve, the second tapered surfaces on said cam members having the same shape and the same angular orientation as the tapered surface in said bushing.

8. A mechanism according to claim 7 wherein said sleeve, said bushing and said passageway in said bushing are cylindrical, and wherein said second tapered surfaces on said cam members are conical.

9. A mechanism according to any one of claims 6, 7 and 8 wherein said actuator pin and said passageway in said sleeve are cylindrical, and wherein said tapered surfaces on the innermost portions of said cam members are conical.

References Cited

UNITED STATES PATENTS

| 2,512,379 | 6/1950 | Quarnstrom | 249—205 |
| 2,419,089 | 4/1947 | Quarnstrom | 249—205 |
| 2,874,409 | 2/1959 | Quarnstrom | 249—205 |
| 2,885,893 | 5/1959 | Lane et al. | 74—527 |

FOREIGN PATENTS 1,174,621  7/1964  Germany.

WESLEY S. RATLIFF, Jr., Primary Examiner

U.S. Cl. X.R.

249—205